(12) United States Patent
Laur et al.

(10) Patent No.: US 6,761,515 B2
(45) Date of Patent: *Jul. 13, 2004

(54) METHOD FOR LENGTHENING THE MACHINING TRAVEL OF A MACHINE-TOOL, DEVICE FOR IMPLEMENTING SAME AND MACHINE-TOOL USING SUCH A DEVICE

(75) Inventors: Raymond Laur, Viviers les Montagnes (FR); André Azema, Saix (FR)

(73) Assignee: Renault Automation Comau, Meudon la Foret (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,702

(22) PCT Filed: Nov. 26, 1998

(86) PCT No.: PCT/FR98/02541

§ 371 (c)(1),
(2), (4) Date: Jul. 27, 1999

(87) PCT Pub. No.: WO99/28079

PCT Pub. Date: Jun. 10, 1999

(65) Prior Publication Data

US 2002/0028118 A1 Mar. 7, 2002

(30) Foreign Application Priority Data

Nov. 27, 1997 (FR) .............................................. 97 14953

(51) Int. Cl.$^7$ ................................................. B23C 1/00

(52) U.S. Cl. ...................... 409/132; 409/134; 409/137; 409/167; 409/235; 483/14; 29/DIG. 94

(58) Field of Search ................................. 409/159, 167, 409/163, 132, 134, 191, 190, 219, 235, 131, 189, 145, 183, 185, 137; 29/DIG. 56, DIG. 86, DIG. 94, 33 P, 563, 564; 483/14

(56) References Cited

U.S. PATENT DOCUMENTS

| | | | | | |
|---|---|---|---|---|---|
| 3,099,873 A | * | 8/1963 | Brainard et al. | ............... | 483/14 |
| 3,124,018 A | * | 3/1964 | Gough | ......................... | 269/60 |
| 3,355,799 A | * | 12/1967 | Daugherty | ..................... | 483/3 |
| 4,187,601 A | * | 2/1980 | Aldrin | ......................... | 29/560 |
| 4,505,464 A | * | 3/1985 | Chitayat | ....................... | 269/73 |
| 4,512,068 A | * | 4/1985 | Piotrowski | .................. | 409/174 |
| 4,987,668 A | * | 1/1991 | Roesch | ......................... | 29/568 |
| 4,999,895 A | * | 3/1991 | Hirose et al. | ................ | 409/134 |
| 5,117,552 A | * | 6/1992 | Babel | .......................... | 409/235 |
| 5,152,645 A | * | 10/1992 | Corsi | .......................... | 409/235 |
| 5,172,464 A | * | 12/1992 | Kitamura et al. | ........... | 29/33 P |

(List continued on next page.)

FOREIGN PATENT DOCUMENTS

| | | | | | |
|---|---|---|---|---|---|
| DE | 289229 A | * | 4/1991 | ................. | 409/132 |
| FR | 2555086 | * | 5/1985 | ................. | 409/191 |
| GB | 2271945 A | * | 5/1994 | | |
| JP | 58-109239 | * | 6/1983 | ................. | 409/159 |

Primary Examiner—A. L. Wellington
Assistant Examiner—Erica E Cadugan
(74) Attorney, Agent, or Firm—Oblon, Spivak, McClelland, Maier & Neustadt, P.C.

(57) ABSTRACT

A method for lengthening the machining travel of a machine-tool operating at a very high speed, including a tool-carrying ram mobile on three axes. The method combines with the machining movements of the tool-carrying ram along one or several axes, one or several rectilinear movements of the part to be machined by parametering and digitizing the relative travels and speeds of the part to be machined with respect to the tool-carrying ram. The invention also concerns the device for implementing this method and the machine-tool using such a device.

14 Claims, 3 Drawing Sheets

U.S. PATENT DOCUMENTS

Figure 1:
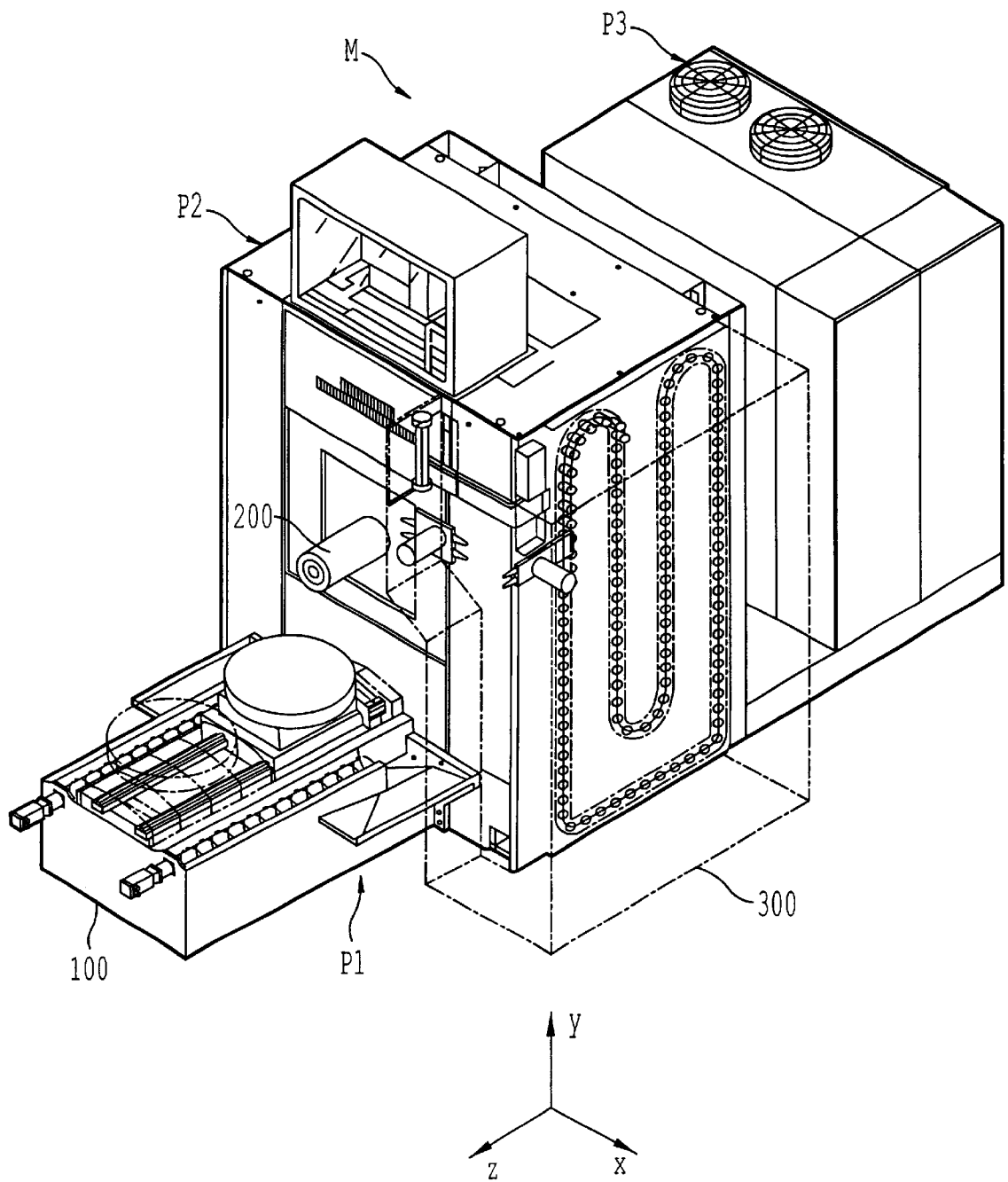

| | | | |
|---|---|---|---|
| 5,178,499 A | * 1/1993 | Umeda et al. | 409/134 |
| 5,181,898 A | * 1/1993 | Piotrowski | 483/3 |
| 5,263,800 A | * 11/1993 | Chen | 409/134 |
| 5,265,497 A | * 11/1993 | Curless | 29/33 P |
| 5,321,874 A | * 6/1994 | Mills et al. | 409/164 |
| 5,346,345 A | * 9/1994 | Jerzycke et al. | 409/235 |
| 5,348,431 A | * 9/1994 | Kusunoki et al. | 409/132 |
| 5,368,425 A | * 11/1994 | Mills et al. | 409/191 |
| 5,387,061 A | * 2/1995 | Barkman et al. | 409/80 |
| 5,439,431 A | * 8/1995 | Hessbruggen et al. | 29/DIG. 56 |
| 5,482,414 A | * 1/1996 | Hayashi et al. | 409/134 |
| 5,586,848 A | * 12/1996 | Suwijn | 29/DIG. 94 |
| 5,607,269 A | * 3/1997 | Dowd et al. | 409/134 |
| 5,662,568 A | * 9/1997 | Lindem | 409/235 |
| 5,688,084 A | * 11/1997 | Fritz et al. | 409/191 |
| 5,700,117 A | * 12/1997 | Sella | 409/219 |
| 5,779,406 A | * 7/1998 | Astor | 409/132 |
| 5,964,016 A | * 10/1999 | Ito et al. | 409/159 |
| 5,984,600 A | * 11/1999 | Gierth | 409/269 |
| 5,988,959 A | * 11/1999 | Sugata | 409/141 |
| 6,012,884 A | * 1/2000 | Azema | 409/191 |
| 6,082,939 A | * 7/2000 | Nakashima et al. | 409/134 |
| 6,364,818 B1 | * 4/2002 | Chen | 409/235 |

* cited by examiner

METHOD FOR LENGTHENING THE MACHINING TRAVEL OF A MACHINE-TOOL, DEVICE FOR IMPLEMENTING SAME AND MACHINE-TOOL USING SUCH A DEVICE

BACKGROUND OF THE INVENTION

1. Field of the Invention

The present invention relates to the field of high speed machining, machine-tools mobile on three axes X, Y and Z, and more particularly to modifications allowing to improve the machining travel of this type of machine.

2. Discussion of the Background

Classically, the tools used in very high speed machining are of the rotary type and are placed at the end of a unique tool-carrying ram mounted moveable along three axes so as to allow machining on a big length, a big width and a big depth, as well as tool exchange, gripping and collection functions in magazines conceived for that purpose.

Generally, these machines comprise several main parts, i.e.:

- an actual machining station comprising the tool driven in rotation at the end of the ram and shaping the part to be machined,
- a driving station placed near the machining station and constituted by a combination of driving mechanisms ensuring the movements along the axes X, Y, Z of the tool-carrying ram, which also ensures, via an electric spindle, the rotary movement of the tool carried at the end,
- a control station collaborating with the driving station according to a pre-established instructions program to ensure and to manage the different machining operations and stages of the different parts to be machined.

The machining station can classically comprise several subsets offering as many additional functions. Thus, for example, a magazine or a tool storage device offers several machining tools to the ram mobile on three axes coming to leave and take the tools, allowing it to ensure as many machining functions as possible on a part to be machined. The machining station can also comprise a device for exchanging parts to be machined managed by the control module and ensuring the exchange between the parts having just been machined and the ones still to be machined.

With the benefit of its experience in the field of high speed machining along three axes and on machines called mono-spindle, the applicant has conceived high precision machines operating at a high velocity capable of achieving high accelerations and rapidity of function in their movement along three axes X, Y and Z by the use of a logical cinematic structure and innovative driving means, well above that achievable by classical machining machines. The applicant has noticed that these machines, even though they have matched the users requirements up until now, can in some situations prove to have limited use in their machining travel. In fact, to reply to the new criteria of acceleration and rapidity of function required for very high speed machining machine-tools, combined with the concern for compactness of the machines, the travels along the three different axes are comprised in intervals defined by the mechanical or geometrical limits of the machine, which intervals can prove to be too short for some applications.

The limitation to the travel is a difficulty often found in the conception of machine-tools and several devices can be found in the prior art, ensuring a movement of the part to be machined so as to enable it to get nearer the tool thus avoiding unnecessary travel and travel times (until the tool is in contact with the part to be machined and begins the machining stage) which would reduce the machine's performance. Nevertheless, no device has been conceived to enable the lengthening of the machining travel of a machining machine-tool of the type comprising a tool-carrying ram which, ensuring functions of tool gripping, exchange, guidance, and driving moves along three axes X, Y and Z, the three axes forming an orthogonal spatial system of axes and Z being the longitudinal axis of the machine and of which the movements are ensured by linear motors, such as in the case of the machines conceived by the applicant. In fact, the total freedom of movement of the tool-carrying ram combined with its speed due to the use of linear motors, brings new technical criteria and opens a field of possibilities in programming machining on one part to be machined, never previously reached. The existing machine-tools using a tool-carrying ram moving along three axes are, on the whole, less fast and and less precise, and do not have the dynamic constraints of the ones conceived by the applicant, in view of their size, higher travels obtained, or less performing driving means. In addition, the existing devices which ensure the movement of a part to be machined are essential to the following machining stage because the tools of the classical machine-tools do not move parallel to the movements of the part to be machined. Thus, on the axes followed for the movements of the part to be machined, the ram, the headstock and/or the tool-carrying spindle stay fixed.

The applicant has thus studied the concept of an innovative method enabling the widening of the capacities of machines' machining travel. The difficulty of such a concept is to offer a device enabling to adapt to a machine already answering perfectly to users' requirements in most applications and for most of the parts to be machined so that it is not built-into the machine to avoid an overload when the device is not necessary. Furthermore, as the increase of the lengths of machining travels of a machine-tool have for direct and known consequence to reduce the velocity of the machine, such a device would be set in motion or would start to function only when the part or the side of the part to be machined (via a machining program) so requires.

SUMMARY OF THE INVENTION

In view of this situation and the specifications required, the applicant has carried out research aimed at achieving the aforementioned targets. This research has led to the conception of a method which does not reduce the performance of the basic machining machine-tool, integrable but not built-in to it, and enabling once it has started to function, the machining of parts to be machined which are longer, wider or higher.

According to the main characteristic of the invention, the method for lenghtening the machining travel of a high speed machine-tool of the type comprising a tool-carrying ram ensuring tool gripping, exchange, guidance and driving and moving along three axes X, Y and Z, the three axes forming an orthogonal spatial system of axes and Z being the longitudinal axis of the machine, the movements being ensured by linear motors, is remarkable in that it consists in combining to the machining movements of the tool-carrying ram along one or several axes, one or several rectilinear movements of the part to be machined by parametering and digitizing the relative travels and speeds of the part to be machined with respect to the tool-carrying ram.

This method is particularly advantageous as it enables to lengthen the useful travel of the tool-carrying ram of the machine-tool without reducing the dynamic performances. In fact, the mobility on one or several axes of the part to be machined with respect to the tool-carrying ram already mobile on these three axes enables not only to bring the part to be machined closer to avoid the non machining times and reduce the unecessary travel of the tool-carrying ram, which is what classically occurred in the devices of the prior art but also to reduce these times of bringing closer by moving the tool-carrying ram and the part to be machined along parallel axes but in an opposite way thus reducing dead time.

In this precise application, once the part to be machined and the tool-carrying ram are close, several machining configurations are possible:

- either the tool-carrying ram is alone in executing the travel and rotatably driving the tool towards the fixed part to be machined,
- or the part to be machined is alone in executing the travel in moving towards the tool-carrying ram fixed with the tool rotatably driven,
- or the part to be machined and the tool-carrying ram both move along a parallel direction but in an opposite way.

According to a particularly advantageous characteristic of the invention, this method consists in parametering and digitizing the relative travels and speeds of the part to be machined with respect to the travels on axis Z of the tool-carrying ram. This characteristic is particularly innovative in view of the fact that most machine-tools do not use a tool-carrying ram ensuring a translation on axis Z and they consequently do not ensure the suitability between the translation on axis Z of the tool-carrying ram and a translation parallel with axis Z of the part to be machined in a same direction. This suitability thus requires the mastering of new parameters.

The invention also concerns the device enabling to implement the method for lengthening the machining travel of a high speed machine-tool of the type comprising a tool-carrying ram moving along three axes X, Y and Z, the three axes forming an orthogonal spatial system of axes and Z being the longitudinal axis of the machine, the movements being ensured by linear motors. This device is remarkable in that it comprises inside the machining zone, a part-carrying clamping subset combined with a driving subset ensuring the translation on one or several axes parallel with the axes of the movements of the tool-carring ram, of the part-carrying clamping subset. Furthermore, the driving subset comprises linear motors which drive in translation, synchronising with the movements of the tool-carrying ram on a pair of rails respectively parallel with axes X, Y and Z of the movement of the tool-carrying ram, the part-carrying clamping subset. This consistency in the choice of driving means enables to produce movements of the parts to be machined as fast as the movements of the tool-carrying ram and avoids to penalize the performance of the whole of the machine while ensuring a lengthening of the travels.

Also, contrary to the devices of the prior art, the movement of the part to be machined is not necessary to the functioning of the machine-tool during simple machining thus enabling to leave the part to be machined in fixed position.

The invention also concerns a machining machine-tool adopting the device of the invention. This machine-tool is of the type comprising a machining station, a driving station, a control station, the machining station taking up at least one mobile set for moving or exchanging the parts to be machined of the invention, the mobile set comprising a sealed device isolating the machining station from the outside so as to avoid projections of swarf and is remarkable in that it develops itself around the mobile subset, and thus from its own leaktightness device, an isolating device, linked to its frame, separating the machining station and the elements it is made of from the outside.

This characteristic justifies itself by the new constraints required for the speed of movement during the movements of the parts to be machined. In fact, such devices for exchanging parts or for moving parts to be machined, classically comprises a leaktightness device constituted by a cover and a separating wall which enables to isolate the machining station and to avoid the projection of swarf inside. The movements of the device of the invention have forced the designers to ensure leaktightness of the mobile set with respect to the fixed frame of the machine by rubbing. Therefore, the criteria of speed required for the movements of such a device are such that the rubbing must be limited as far as possible to the detriment of the leaktightness against swarf. Thus, the technological solution of the invention enables to create a second protection around the elements constituting the machining station of the machine-tool so as to avoid the spreading of swarf which would have gone through the first cover or through the first protection. Another advantage of this double protection is that, even though they are protected by their own cover or separating wall, the elements constituting the machining station of the machine-tool and more particularly the lengthening device of the travel of the invention which is a mobile device can work out to be dangerous for any nearby handlers, users or technicians. The presence of this second protection thus enables to answer to the safety at work criteria.

The fundamental concepts of the invention having just been detailed hereinabove in their most elementary form, more details and characteristics will come out more clearly when reading the description hereinafter using as a non limitative and having regard to the attached drawings, a device enabling to implement the method of the invention and of a machine-tool using such a device in accordance with the invention.

This description refers to the enclosed drawings on which:

BRIEF DESCRIPTIONS OF THE DRAWINGS

Figure 2:
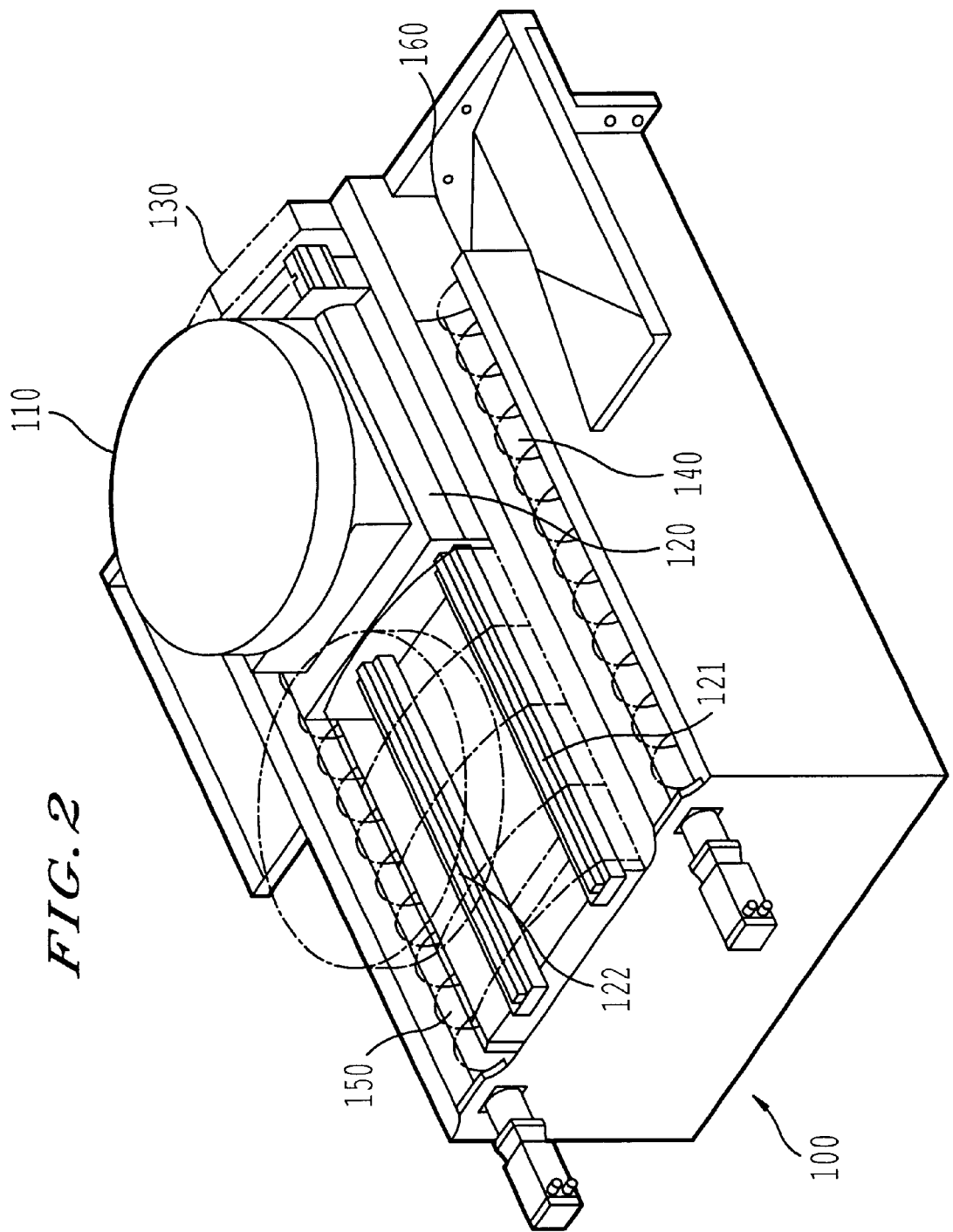
Figure 3:
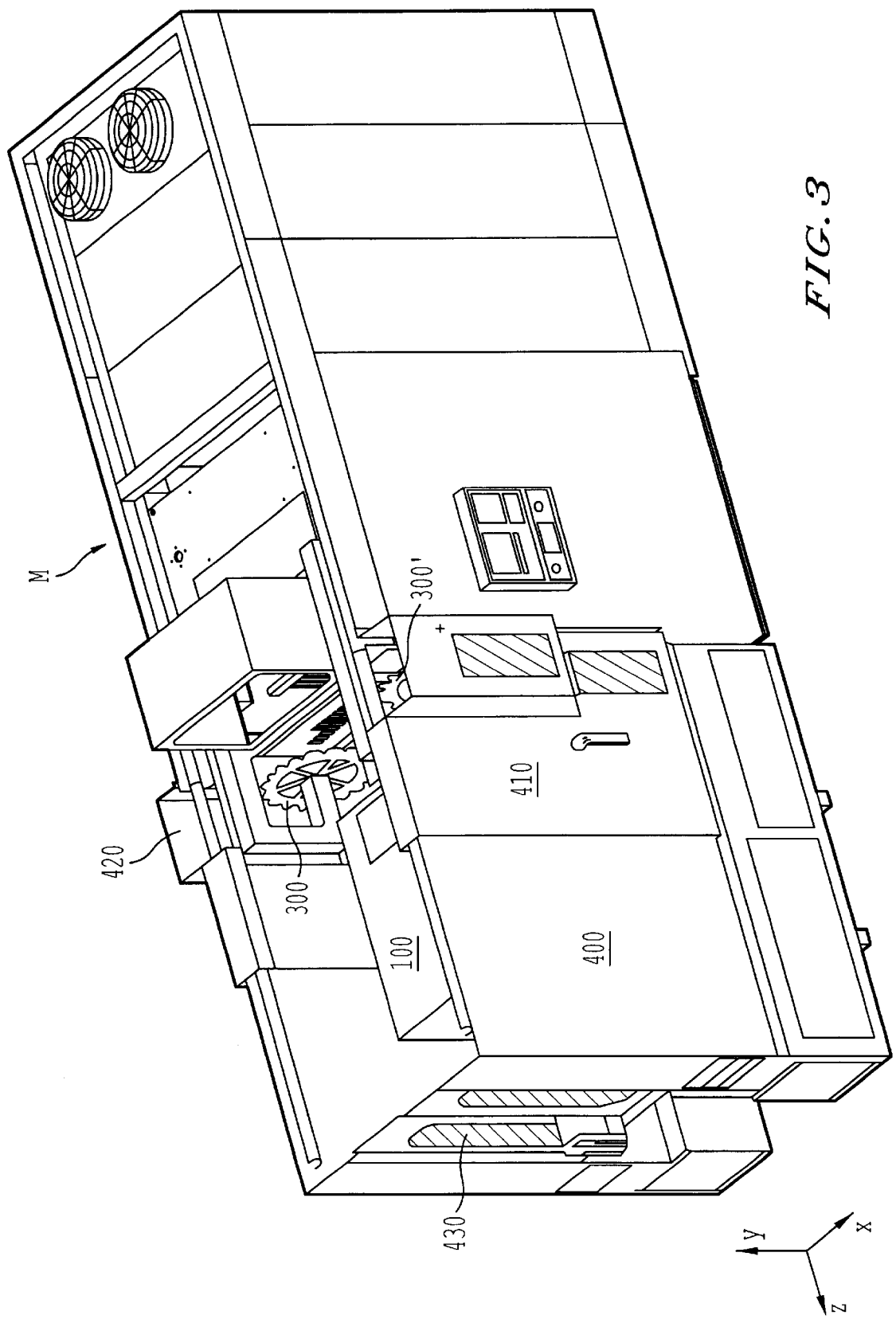

FIG. 1 is a perspective view of a machine-tool comprising a device in accordance with the invention, FIG. 2 is a perspective view of the lengthening device of the machining travel in accordance with the invention, FIG. 3 is a perspective view of a machine-tool in accordance with the invention comprising an added leaktight wall.

DETAILED DESCRIPTION OF THE PREFERRED EMBODIMENTS

As illustrated on the drawing of FIG. 1, the device for lengthening the machining travel referenced as 100 as a whole is placed against a machining machine-tool M operating at high speed of the type comprising a tool-carrying ram 200 moving along three axes X, Y and Z the three axes forming an orthogonal spatial system of axes and Z being the longitudinal axis of the machine, the movements being ensured by linear motors. This machining machine-tool classically comprises several main parts, i.e.:

- an actual machining station P1 comprising the tool rotatably driven at the end of the tool-carrying ram 200 and shaping the part to be machined,
- a driving station P2 situated after the machining station P1 and constituted by a set of driving mechanisms ensuring the movements along the axes X, Y and Z of the tool-carrying ram 200, which also ensures, via an electric spindle, the rotary movement of the tool carried at the end, a control station P3 collaborating with the driving station P2 according to a pre-established instructions program to ensure and to manage the different machining operations and stages of the different parts to be machined.

The machine-tool M such as illustrated also comprises a tool storage device 300 which offers several machining tools to the tool-carrying ram 200 coming to take and leave them enabling the tool-carrying ram 200 to ensure as many machining functions as possible on a part to be machined.

As illustrated on the drawing of FIG. 2 and according to a particularly advantageous characteristic of the invention, the lengthening device 100 is made of, inside the machining station P1, a part-carrying clamping subset 110 combined with a driving subset 120 ensuring the translation parallel with axis Z of the movement of the tool-carrying ram, of the part-carrying clamping subset 110.

This sole additional translation combined with the movements along three axes of the tool-carrying ram 200, enables to answer to the lengthening needs of the machining travels along the three classical axes. In fact, according to a non limitative embodiment, the part-carrying clamping subset 110 comprises a rotation axis, classically called axis B so as to present, to the tool-carrying ram 200, the different sides of the part to be machined. This rotation movement combined with the Z translation movement of the part to be machined and the possibilities of tool movements and tool exchange of the tool-carrying ram 200 enables to achieve, while lengthening the travel, most machining stages.

Furthermore, the mobility of the part-carrying clamping subset 110 has for other advantage that it enables its classical rotation along a vertical axis (usually called axis B) parallel with axis Y. The speed of execution of a machining stage requires the maximum closeness between the part to be machined and the tool-carrying ram 200, such closeness even though possible, would prevent the rotation of the part when the machining stage changes by direct contact of the part on the tool or on the tool-carrying ram.

Furthermore, on other configurations, the part-carrying clamping subset 110 ensures the support of several parts to be machined separated by a leaktighness wall preventing the projection of machining swarf on the parts not yet machined or on the system of axes of this one when they are removed from the part-carrying clamping subset. Such leaktightness walls are integral with the part-carrying clamping subset 110 and rotate at the same time which implies that the machining station must be wide enough to enable such a rotation. The translation of the part-carrying clamping subset thus enables the rotation of parts and of voluminous machining sets which would be impossible to use in a device of fixed classical part-carrying clamping subset which eases greatly the setting of the machining assembly and of the machining station cubicle.

As illustrated on the drawing of FIG. 2 and according to a particularly advantageous characteristic of the invention, the driving subset 120 comprises linear motors which drive in translation, in synchronisation with the movements of the tool-carrying ram 200, on a pair of rails 121 and 122 parallel with axis Z of the movement of the tool-carrying ram 200, the part-carrying clamping subset 110. The advantage of using a pair of rails is that it enables the use of linear motors in good conditions. Furthermore, the combination of linear motors with rails is the same driving technology as the one used for the movements of the tool-carrying ram, which not only enables to ease the piloting to drive the part to be machined in synchronisation with those of the tool-carrying ram 200 but also to offer dynamic acceleration and speed characteristics of the movements of the part equivalent to those of the movements of the tool-carrying ram 200.

According to a preferred embodiment of the invention, the rails 121 and 122 of the travel lengthening device 100 and their driving means, in this context of the linear motors, are protected against the projection of swarf by a telescopic cowling 130 (represented in broken line). In addition, still in the context of a discharge or protection of the part-carrying clamping subset 110 against swarf, the telescopic cowling 130 comprises along the travel and on each side, a discharge device 140 and 150 of the swarf, of the Archimede screw type bringing back the swarf towards the orifice 160 of main discharge of the machining station.

According to a particularly judicious characteristic of the invention, the part-carrying clamping subset 110 allows access, when it moves away from the vertical plane of machining of the machine-tool M, to housings which ensure the storage of tools of a large dimension arranged so that the tool-carrying ram 200 can ensure their gripping. Thus, the tools which cannot be stored in the storing device 300 because of their length can be arranged in housings which are not accessible during a simple machining stage because of the closeness of the part but when this or these tools are needed in machining, these housings become not only accessible but also useable by the tool-carrying ram 200 by the reversing of the part-carrying clamping subset 110.

According to a particularly advantageous characteristic of the invention, the device 100 of the invention comprises housings enabling to receive large dimension tools accessible to the tool-carrying ram so that the latter can ensure their gripping. In this configuration, the device 100 enabling to move the part to be machined, ensures the function of a tool magazine coming to place in the action range of the tool-carrying ram 200 tools of large dimension needed for the machining of the part governed on the device 100.

As illustrated on the drawing of FIG. 3, the machining machine-tool referenced as M as a whole is of the type comprising a machining station P1, a driving station P2, a control station P3 and of which the machininig station P1 comprises a device 100 for lengthening the machining travel of parts to be machined in accordance with the invention. As described hereinabove, such mobile devices 100 classically comprise a leaktightness device isolating the immediate machining zone around the tool-carrying ram 200 and that part to be machined to prevent the projection of swarf.

According to a particularly judicious technological choice, this machine M comprises, around the mobile set and its leaktightness device, an additional leaktightness wall 400, linked to the frame, surrounding the machining station as a whole by separating it from the outside. The aim of this leaktightness wall 400 is to improve leaktightness of the machining station in relation to the outside environment and this for two main reasons:

one is that the leaktightness of the machining station is difficult to guaranty when the part-carrying clamping subset such as the invention is mobile, the other is that handling, or technical interventions can be particularly dangerous if they are carried out in the vicinity of a mobile subset.

According to an advantageous but non limitative embodiment, the leaktightness wall 400 is constituted by an outer cover which extends the frame of the machine-tool from its machining station and takes up about the same outside dimensions at the level of the width and the height.

This technological choice has another particularly advantageous consequence: the storage devices and more particularly the rotary storage devices such as illustrated on the drawing of FIG. 3 and referenced as 300 and 300' are classically arranged inside a sealed chamber of dimensions enabling their rotation and enabling the tool-carrying ram to have the stored tools at its disposal. They can move in the space separating the first wall isolating the immediate environment of the machining zone (i.e. the tool, the tool-carrying ram and the part to be machined), the machining zone being defined by the leaktightness device of the part-carrying device and by the wall of the machine-tool machining station, of the second wall 400 thus avoiding the use of a specific sealed chamber to the tool magazine.

The use of dimensions about equal to the dimensions of the outer frame of the machine-tool M in width and in height has for advantage to respect the compactness criteria required for the dimensions of such machines.

As illustrated and according to a particularly advantageous characteristic of the invention, the outer cover 400 is parallelepipedic and comprises three openings 410, 420, 430 allowing access to the inside and/or to the elements constituting the machining station. Thus, the openings 410 and 420 are, according to a preferred embodiment of the invention, sliding doors enabling according to the sliding travel to allow access progressively:

to the tool housings of the rotary tool magazines 300 and 300' when those are stopped but during machining in view of the presence of the first leaktightness wall, to the mobile device in accordance with the invention.

These different openings are advantageously fitted with inspection windows enabling to control the good working order of the machine-tool.

In this precise case, the principle of double cover has for other advantage to reduce the shock-proof protection surface which must surround according to safety rules the machining station and thus reduce the material costs. This second outer cover indeed enables that only the immediate machining zone around the tool and the part to be machined are protected by armoured windows, and steel walls. The rest of the machining station can be protected or isolated from outside by the second wall 400 which can be advantageously made from less resistant and thus cheaper materials, more particularly the windows, than those used for the first protection.

It is understood that the description and illustration just given hereinabove of the method, device and machine-tool are given for the purpose of disclosure and not limitation. It is obvious that various arrangements of, modifications and improvements to the example here above will be possible without departing from the scope of the invention taken in its broadest aspects and spirits.

In order to permit better understanding of the drawings, a list of the reference symbols with their explanations is presented here below.

100 . . . Lengthening travel device
110 . . . Part-carrying clamping subset
120 . . . Driving subset
   121,122 . . . Guide rails
130 . . . Protection cover of guide rails
140,150 . . . swarf discharge device
160 . . . Main orifice of swarf discharge
200 . . . Tool-carrying ram
300,300' . . . Storage device
400 . . . Outer cover
410,420,430 . . . Opening accesses of the outer cover
M . . . Machining machine-tool as a whole
P1 . . . Machining station
P2 . . . Driving station
P3 . . . Control station

What is claimed is:

1. A method for lengthening a machining travel of a machine tool comprising a tool-carrying ram which provides tool gripping, exchange, guidance, driving and moving along three axes X, Y and Z, the three axes forming an orthogonal spatial system of axes and Z being a longitudinal axis of the machine-tool, movement of the tool-carrying ram being provided by linear motors, said method comprising the step of combining with the machining movements of the tool-carrying ram along one of the three axes, at least one simultaneous movement of a part to be machined parallel to a rotational axis of the tool-carrying ram and one of the three axes by synchronizing relative travels and speeds of the part to be machined with respect to those of the tool-carrying ram, wherein a first cover made of a first material is provided around the part to be machined and a second cover made of a second material is provided around the machine tool and first cover, wherein the first material is different from the second material.

2. The method according to claim 1, WHEREIN the synchronizing is along axis Z of the tool-carrying ram.

3. The method according to claim 1, further comprising the step of discharging swarf using a swarf discharge device positioned adjacent to the part.

4. A device for a machine-tool having a tool-carrying ram configured to move along three axes X, Y and Z, the three axes forming an orthogonal spatial system of axes and Z being a longitudinal axis of the machine-tool, the ram being driven by linear motors, said device comprising a part-carrying clamping subset positioned inside a machining zone and combined with a driving subset configured to translate said clamping subset along an axis parallel with a rotational axis of the ram and one of the three axes, said device further comprising a first cover made of a first material provided around said machining zone and a second cover made of a second material provided around said machine-tool and first cover, wherein said first material is different from said second material.

5. The device according to claim 4, WHEREIN said driving subset ensures the translation of the part-carrying clamping subset parallel with axis Z only.

6. The device according to claim 4, WHEREIN said part-carrying clamping subset allows access of the tool-carrying ram, when said part-carrying clamping subset moves away from a vertical plane of machining of the machine-tool, to housings which ensure storage of tools arranged so that the tool-carrying ram can ensure gripping of the tools.

7. The device according to claim 4, further comprising housings configured to receive tools accessible to the tool-carrying ram so that the tool-carrying ram can ensure gripping of the tools.

8. The device according to claim 4, WHEREIN said driving subset comprises linear motors which drive in translation said part-carrying clamping subset along a pair of rails parallel with the Z axis, and wherein movement of said part-carrying clamping subset is synchronized with the movements of the tool-ram.

9. Device according to claim 8, wherein said driving subset ensures the translation of the part-carrying clamping subset parallel with axis Z only.

10. The device according to claim 4, further comprising at least one swarf discharge device positioned adjacent to said part-carrying clamping subset.

11. A machine-tool comprising:

a machining station, a driving station, and a control station, said machining station comprises at least one mobile set for moving and exchanging a part to be machined and includes a machine-tool device having a tool-carrying ram configured to move along three axes X, Y, and Z, the three axes forming an orthogonal spatial system of axes and Z being a longitudinal axis of the machine-tool, the ram being driven by linear motors, said at least one mobile set comprising a part-carrying clamping subset positioned inside a machining zone and combined with a driving subset configured to translate said clamping subset along an axis parallel with a rotational axis of the ram and one of the three axes, said at least one mobile set comprising a cover made of a first material isolating an immediate machining zone around the tool carrying ram and around the part so as to avoid projection of swarf, wherein said machine-tool further comprises an isolating wall made of a second material around the machine-tool device and said cover to surround the machining station as a whole and separate the machining station from an outside, wherein said first material is different from said second material.

12. The machining machine-tool according to claim 11, WHEREIN said isolating wall comprises an outer cover which extends from a frame of said machine-tool and has an outside width and an outside height that are identical.

13. The machining machine-tool according to claim 12, WHEREIN the outer cover is parallelepipedic and comprises at least one opening allowing access to an inside of and to elements of the machining station.

14. The machine-tool according to claim 8, and further comprising at least one swarf discharge device positioned adjacent to said part-carrying clamping subset.

* * * * *